United States Patent [19]
Tanaka et al.

[11] Patent Number: 5,211,603
[45] Date of Patent: May 18, 1993

[54] AIR INDUCTION DEVICE FOR USE IN MOTOR VEHICLE

[75] Inventors: Kazumasa Tanaka, Kanagawa; Hidenobu Arakawa, Tokyo, both of Japan

[73] Assignees: Nissan Motor Co., Ltd.; Calsonic Corporation, both of Japan

[21] Appl. No.: 851,410

[22] Filed: Mar. 13, 1992

[30] Foreign Application Priority Data

Jun. 10, 1991 [JP] Japan .................................. 3-164931

[51] Int. Cl.$^5$ .............................................. B60H 1/24
[52] U.S. Cl. ................................................ 454/139
[58] Field of Search ................ 454/139, 156, 159, 161

[56] References Cited

U.S. PATENT DOCUMENTS

| | | | |
|---|---|---|---|
| 4,779,672 | 10/1988 | Seikou et al. | 454/139 X |
| 4,802,405 | 2/1989 | Ichitani et al. | 454/139 X |

FOREIGN PATENT DOCUMENTS

| | | | |
|---|---|---|---|
| 244912 | 9/1989 | Japan | 454/139 |
| 41915 | 2/1990 | Japan | 454/139 |

*Primary Examiner*—Harold Joyce
*Attorney, Agent, or Firm*—Lowe, Price, LeBlanc & Becker

[57] ABSTRACT

An air induction device for use in a motor vehicle. The vehicle has first and second air passages through which outside air and inside air pass respectively. The air induction device comprises a casing in which a motor-driven blower fan is installed. The casing has upper and lower portions. The upper portion has at least two openings which are respectively connected to the first and second air passages and selectively closed and opened by a door structure. The lower portion includes a bottom wall portion and two inclined side wall portions which are raised from a periphery of the bottom wall portion. An outlet passage conveys air from the interior of the casing to a remote position. The two inclined side wall portions are formed with respective lower inlet openings which are connected to the second air passage and selectively closed and opened by respective pivot doors. Each door is arranged to pivot outside the casing.

8 Claims, 2 Drawing Sheets

AIR INDUCTION DEVICE FOR USE IN MOTOR VEHICLE

BACKGROUND OF THE INVENTION

1. Field of the Invention

The present invention relates in general to air induction devices used in motor vehicles, and more particularly to air induction devices arranged upstream of an essential unit (viz., unit including a heater and an evaporator) of an automotive air conditioner for directing inside and/or outside air toward the essential unit.

2. Description of the Prior Art

In order to clarify the task of the present invention, one conventional air induction device of the above-mentioned type will be described with reference to FIG. 3 of the accompanying drawings, which device is disclosed in Japanese Utility Model First Provisional Publication 62-16508.

In the drawing, denoted by numeral 1 is a blower fan which is driven by an electric motor 2. Denoted by numeral 3 is a spirally recessed part of a casing, which part extends around the blower fan 1. The spirally recessed part 3 has an outlet opening 4 which is arranged upstream of an essential unit (not shown, which includes a heater and an evaporator) of an air conditioner installed in a motor vehicle.

The spirally recessed part 3 has upper and lower portions largely opened. Two upper inlet doors 5 are located above the opened upper portion of the spiral part 3, each door 5 being pivotal about a pivot pin 6. When, with the blower fan 1 kept rotated, the doors 5 assume the positions illustrated by the phantom lines, outside air is introduced into the spirally recessed part 3 as indicated by the arrow "A", while, when the doors 5 assume the positions illustrated by the solid lines, inside air is introduced into the spiral part 3 as indicated by the arrows "B" and "B". When the doors 5 assume intermediate positions, both outside air and inside air are introduced to and mixed in the spiral part 3.

It is to be understood that outside air is fresh air outside the vehicle and inside air is air within the vehicle cabin.

Denoted by numeral 7 is a lower case which is secured to the opened lower portion of the spiral part 3. The lower case 7 has a substantially flat lower wall formed with an air induction opening 8. The air induction opening 8 is selectively opened and closed by a lower inlet door 9 which is pivotally connected to the lower case 7 through a pivot shaft 10. When, with the blower fan 1 kept rotated, the lower inlet door 9 assumes the open position as shown, inside air is introduced into the spiral part 3 through the opening 8 as indicated by the arrow "C".

When the air conditioner is under normal operation, the lower inlet door 9 closes the opening 8 and the two upper inlet doors 5 assume the intermediate positions. Thus, under this condition, outside air and inside air are introduced into the spiral part 3 through the opened upper portion of the part 3 and led to the essential unit of the air conditioner by the rotating blower fan 1.

When there is a need of larger amount of air directed to the essential unit, also the lower inlet door 9 is opened.

In the conventional air induction device described hereinabove, the lower inlet door 9 is arranged within the lower case 7, that is, the door 9 is arranged to pivot within the lower case 7, as is understood from the drawing. This arrangement however causes the air induction opening 8 to exhibit a non-negligible resistance against introduction of the inside air into the lower case 7 therethrough even when the lower inlet door 9 assumes its open position. This is because, as is shown by the smaller arrow, part of air led through the opening 8 is forced to collide against the door 9. If the size of the air induction opening 8 is increased for a smoother introduction of the air therethrough, a larger door 9 becomes necessary, which causes a need of increasing force with which the door 9 is handled. Furthermore, increase in size of the door 9 narrows the effective space defined in the lower case 7.

SUMMARY OF THE INVENTION

It is therefore an object of the present invention to provide an air induction device of automotive air conditioner, which is improved as compared with the above-mentioned conventional device.

According to the present invention, there is provided an air induction device of automotive air conditioner, in which the inside air can be smoothly introduced into the spirally recessed part of the casing without increasing the size of the air induction opening.

According to the present invention, there is provided an air induction device for use in a motor vehicle having first and second air passage means through which outside air and inside air pass respectively. The air induction device comprises a casing having upper and lower portions, the lower portion including a bottom wall portion and two inclined side wall portions which are raised from a periphery of the bottom wall portion; an electric motor installed in the casing; a blower fan installed in the casing and driven by the electric motor; outlet passage means for conveying air from the interior of the casing to a remote position; first means defining in the upper portion of the casing at least two upper inlet openings which are respectively connected to the first and second air passage means; door means for selectively opening and closing the two openings of the upper portion; second means defining in the two inclined side wall portions respective lower inlet openings which are connected to the second air passage means; and two doors pivotally connected to the two inclined side wall portions to selectively open and close the respective lower inlet openings respectively, each door being arranged to pivot outside the casing.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
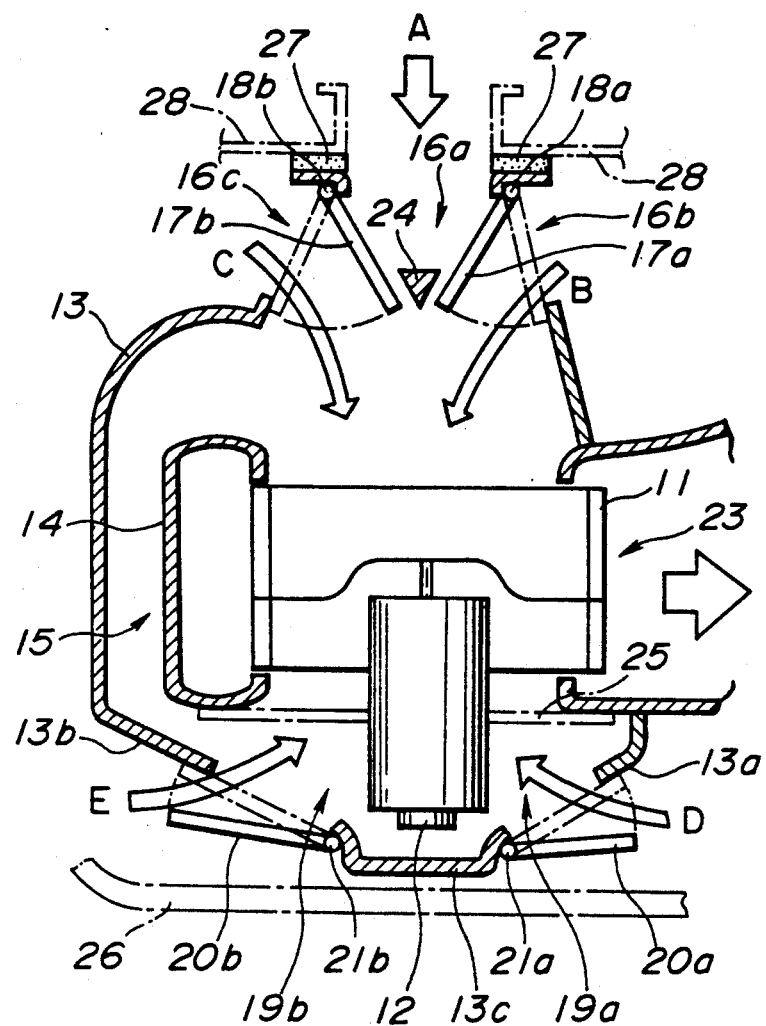
FIG. 1 is a schematic illustration of an air induction device for automotive air conditioner, which is an embodiment of the present invention.
Figure 2:
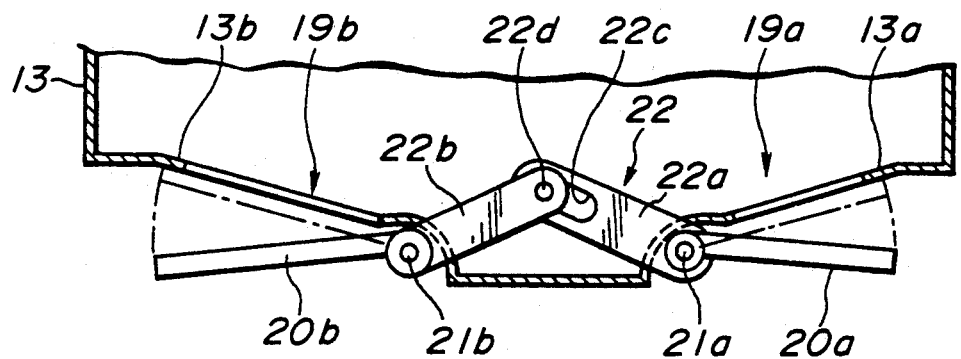
FIG. 2 is an enlarged sectional view of an essential portion of the air induction device of the invention.

Referring to FIGS. 1 and 2, particularly FIG. 1, there is shown an air induction device of automotive air conditioner, according to the present invention.

In FIG. 1, designated by numeral 11 is a blower fan which is driven by an electric motor 12, these fan 11 and motor 12 being installed in a blower casing 13. Designated by numeral 25 is a bracket for supporting the motor 12 in the casing 13.

Within the blower casing 13, there is installed a spirally recessed annular member 14 which extends around the blower fan 11. As shown, the annular member 14 and the blower casing 13 are spaced from each other to define therebetween a considerable air passage 15.

The blower casing 13 is formed with an outlet opening 23 from which a tube extends to an essential unit (not shown, which includes a heater and an evaporator) of the air conditioner installed in a motor vehicle.

The blower casing 13 is formed at an upper portion thereof with three inlet openings 16a, 16b and 16c. The inlet opening 16a is connected to an air box 28 through which fresh outside air is introduced into the blower casing 13 as indicated by the arrow "A". The air box 28 is connected to the blower casing 13 having a seal member 27 disposed therebetween. The other two inlet openings 16b and 16c are openings through which inside air is introduced into the casing 13 as indicated by the arrows "B" and "C".

The inlet openings 16b and 16c are respectively provided with inlet doors 17a and 17b, each door 17a or 17b being pivotally connected through a pivot pin 18a or 18b to an upper portion of the blower casing 13. Thus, the inlet openings 16b and 16c are selectively opened and closed by the respective inlet doors 17a and 17b.

Located between the two inlet openings 16b and 16c is a door stopper 24 against which leading ends of the inlet doors 17a and 17b can abut. That is, when the inlet doors 17a and 17b assume full open positions having the leading ends contacting with the door stopper 24, the two inlet openings 16b and 16c are fully opened and at the same time the inlet opening 16a is fully closed by the doors 17a and 17b, as is understood from the drawing. While, when the inlet doors 17a and 17b assume full close positions as illustrated by the phantom lines, the two inlet openings 16b and 16c are fully closed and at the same time the inlet opening 16a is fully opened. When the inlet doors 17a and 17b assume intermediate positions as shown by the solid lines, the three inlet openings 16a, 16b and 16c are all opened but partially and thus both outside air "A" and inside air "B" are introduced into the blower casing 13.

As is seen from FIG. 1, the blower casing 13 is integrally formed with a lower case portion into which a lower portion of the electric motor 12 is projected.

The lower case portion comprises two inclined side wall portions 13a and 13b and a bottom wall portion 13c. The bottom wall portion 13c has a flat surface surrounded by a raised periphery.

The inclined side wall portions 13a and 13b are respectively formed with inlet openings 19a and 19b. Each inlet opening 19a or 19b is selectively opened and closed by a lower inlet door 20a or 20b which is pivotally connected to the bottom wall portion 13c through a pivot shaft 21a or 21b.

It is to be noted that each lower inlet door 20a or 20b is arranged to pivot outside the blower casing 13. For achieving such outside pivoting of the door 20a or 20b, the pivot shaft 21a or 21b is arranged on an outer surface of the bottom wall portion 13c. When the lower inlet doors 20a and 20b are opened, inside air is introduced into the lower case portion through the inlet openings 19a and 19b as indicated by the arrows "D" and "E".

Designated by numeral 26 is an under cover which constitutes a part of an instrument panel (not shown) of the vehicle.

The detail of the pivotal connection of the lower inlet doors 20a and 20b to the lower case portion is shown in FIG. 2.

As shown in this drawing, the pivot shafts 21a and 21b are rotatably disposed in rounded recesses formed in the raised periphery of the bottom wall portion 13c. The lower inlet doors 20a and 20b are secured to the pivot shafts 21a and 21b to pivot therewith. The pivot shaft 21a has an extension which leads to a drive device (not shown).

The two pivot shafts 21a and 21b are connected through a link mechanism 22 which comprises a first link 22a secured to the pivot shaft 21a and a second link 22b secured to the other pivot shaft 21b. The first link 22a has an elongate opening 22c with which a pin 22d fixed to the second link 22b is slidably engaged.

Thus, when the drive device is energized to rotate the pivot shaft 21a, the lower inlet doors 20a and 20b are pivoted synchronously to open or close the corresponding inlet openings 19a and 19b.

When there is a need for feeding the air conditioner with fresh outside air, the upper inlet opening 16a is opened having the other two upper inlet openings 16b and 16c closed by the inlet doors 17a and 17b and at the same time the lower inlet openings 19a and 19b are closed by the lower inlet doors 20a and 20b. With this, by the work of the blower fan 11, the fresh outside air is introduced into the blower casing 13 through the upper inlet opening 16a, led into the spiral recess of the annular member 14 through its upper open portion, and led to the essential unit of the air conditioner through the outlet opening 23.

During this, part of the fresh outside air introduced into the blower casing 13 is permitted to flow through the air passage 15 and flow into the spiral recess of the annular member 14 through its lower open portion. This means that the fresh outside air can reach the essential unit of the air conditioner smoothly without suffering marked resistance from the blower casing 13.

When there is a need for feeding the air conditioner with inside air, the two upper inlet openings 16b and 16c are opened having the other upper inlet opening 16a closed by the inlet doors 17a and 17b and the lower inlet openings 19a and 19b are closed by the inlet doors 20a and 20b. With this, by the work of the flower fan 11, the inside air is introduced into the blower casing 13 through the two upper inlet openings 16b and 16c, led into the spiral recess of the annular member 14 though both the upper and lower open portions of the member 14, and led to the essential unit of the air conditioner through the outlet opening 23, like in the above-mentioned fresh air introduction.

When now there is a need of larger amount of inside air fed to the air conditioner, the lower inlet doors 20a and 20b are pivoted to open the corresponding inlet openings 19a and 19b by the drive unit. Thus, under this condition, inside air is fed into the blower casing 13 through the four inlet openings 16b, 16c, 19a and 19b. This means that the inside air can reach the essential unit of the air conditioner smoothly without suffering marked resistance from the blower casing 13.

In the following, advantages of the present invention will be described.

First, since the lower inlet doors 20a and 20b are arranged to pivot outside the blower casing 13, inside air introduction from the lower inlet openings 19a and 19b is smoothly carried out without suffering marked resistance from the doors 20a and 20b, unlike in the aforementioned conventional device wherein the door 9 (see FIG. 3) is arranged to pivot within the lower case 7.

Figure 3:
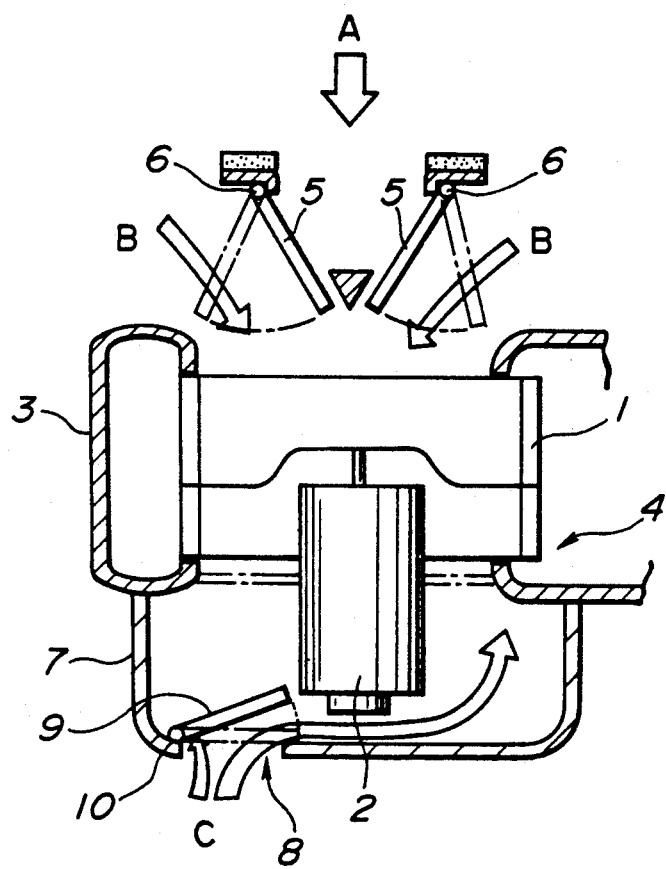
FIG. 3 is a view similar to FIG. 1, but showing a conventional air induction device.

Second, because of provision of the two lower inlet openings 19a and 19b, the inside air introduction into the blower casing 13 from the lower case portion is much smoothed as compared with the conventional device in which only one inlet opening is formed in the lower case 7 (see FIG. 3).

Third, because the lower inlet doors 20a and 20b are arranged to pivot outside the lower case portion of the casing 13, the effective space in the lower case portion is increased. This induces not only compact construction of the blower casing 13 but also acoustic noise reduction in the casing 13.

Fourth, because the lower inlet openings 19a and 19b are formed in the inclined side wall portions 13a and 13b, enlargement of the openings 19a and 19b has substantially no effect on the height of the blower casing 13.

Fifth, the bottom wall portion 13c of the casing 13 can serve as a pan for collecting rain water or the like.

What is claimed is:

1. An air induction device for use in a motor vehicle having first and second air passage means through which outside air and inside air pass respectively, third and fourth air passage means through with inside air pass, said air induction device comprising:
    a casing having upper and lower portions, said lower portion including a bottom wall portion and two inclined side wall portions which are raised from a periphery of said bottom wall portion;
    an electric motor installed in said casing;
    a blower fan installed in said casing and driven by said electric motor;
    outlet passage means for conveying air from the interior of said casing to a remote position;
    first means defining in said upper portion of said casing at least two upper inlet openings which are respectively connected to said first and second air passage means;
    door means for selectively opening and closing the two openings of said upper portion;
    third and fourth means defining in the two inclined side wall portions respective lower inlet openings which are connected to said second air passage means; and
    two doors pivotally connected to the two inclined side wall portions to selectively open and close the respective lower inlet openings respectively, each door being arranged to pivot outside said casing.

2. An air induction device as claimed in claim 1, in which each of said doors is secured to a pivot shaft which is rotatably connected to a raised peripheral part of the bottom wall portion of the lower portion of said casing.

3. An air induction device as claimed in claim 2, in which said pivot shaft of each door is rotatably disposed in a rounded recess formed in the raised peripheral part of said bottom wall portion.

4. An air induction device as claimed in claim 1, further comprising link mechanism means which is installed in said lower portion of said casing to achieve synchronous movement of said two doors.

5. An air induction device as claimed in claim 4, in which said link mechanism means comprises:
    a first link secured to one of the pivot shafts for the doors;
    a second link secured to the other of said pivot shaft;
    means defining an elongate opening in one of said first and second links; and
    a pin secured to the other of said first and second links, said pin being slidably engaged with said elongate opening.

6. An air induction device as claimed in claim 1, further comprising a spirally recessed annular member which is installed in said casing and extends around said blower fan, said annular member having upper and lower open portions respectively exposed to the interiors of said upper and lower portions of said casing.

7. An air induction device as claimed in claim 6, in which said annular member is spaced from an inner wall of said casing to define therebetween a considerable air passage through which the interiors of said upper and lower portions are communicated.

8. An air induction device as claimed in claim 7, in which said outlet passage means has an opening exposed to the spiral recess of said annular member.

* * * * *